United States Patent [19]

Urban et al.

[11] Patent Number: 5,958,129
[45] Date of Patent: Sep. 28, 1999

[54] PIGMENT FORMULATIONS AND PROCESSES FOR THEIR PREPARATION

[75] Inventors: Manfred Urban, Wiesbaden; Dieter Schnaitmann, Eppstein; Margit Haberlick, Bad Camberg, all of Germany

[73] Assignee: Clariant GmbH, Frankfurt, Germany

[21] Appl. No.: 09/037,075

[22] Filed: Mar. 9, 1998

[30] Foreign Application Priority Data

Mar. 10, 1997 [DE] Germany .............. 197 09 798

[51] Int. Cl.[6] .............. C04B 16/00; C07D 401/00; C08K 5/04
[52] U.S. Cl. .............. 106/498; 106/493; 106/494; 106/495; 106/496; 106/497
[58] Field of Search ............. 106/493, 494, 106/495, 496, 497, 498

[56] References Cited

U.S. PATENT DOCUMENTS

| | | | |
|---|---|---|---|
| 3,357,983 | 12/1967 | Weener et al. | 106/498 |
| 3,554,776 | 1/1971 | Gerson et al. | 106/494 |
| 4,262,851 | 4/1981 | Graser et al. | 106/498 |
| 4,599,408 | 7/1986 | Spietschka et al. | 544/125 |
| 4,709,029 | 11/1987 | Spietschka et al. | 544/125 |
| 4,762,569 | 8/1988 | Miki et al. | 106/476 |
| 5,154,770 | 10/1992 | Spietschka et al. | 106/498 |
| 5,753,030 | 5/1998 | Flatt et al. | 106/498 |

FOREIGN PATENT DOCUMENTS

| | | |
|---|---|---|
| 0035299 | 9/1981 | European Pat. Off. . |
| 0321919 | 6/1989 | European Pat. Off. . |
| 1067157 | 10/1959 | Germany . |
| 3017185 | 11/1981 | Germany . |
| 296300 | 11/1991 | Germany .............. 106/498 |

OTHER PUBLICATIONS

Chemical Abstracts, 55:2136c, abstract of Great Britain Patent Specification No. 835,459 (May 1960).

*Primary Examiner*—Anthony Green
*Attorney, Agent, or Firm*—Susan S. Jackson

[57] ABSTRACT

Novel pigment formulations which comprise at least one organic pigment selected from the class consisting of perylene, perinone, quinacridone, azo, benzimidazolone, anthraquinone or anthanthrone pigments and at least one pigment-dispersing agent of the formula (I)

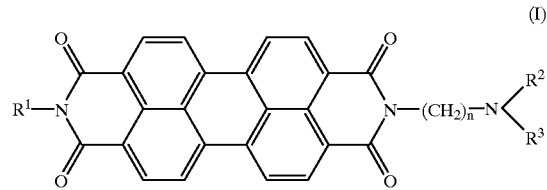

have improved rheological and coloristic properties, in particular in aqueous and nonaqueous coating systems.

13 Claims, No Drawings

PIGMENT FORMULATIONS AND PROCESSES FOR THEIR PREPARATION

The present invention relates to novel pigment formulations having improved coloristic and rheological properties, and to their preparation and use for pigmenting high molecular weight materials.

Pigment formulations are combinations of pigments with structurally analogous pigment-dispersing agents which are substituted by groups having a specific action. Pigment-dispersing agents are added to the pigments to facilitate dispersion in the use media, in particular in coatings, and to improve the rheological and coloristic properties of the pigments. The viscosity of coating concentrates highly pigmented in this manner (millbase) is low, and no flocculation of the pigment particles occurs.

There is a large number of proposals for improving the rheological and coloristic properties of organic pigments by addition of pigment-dispersing agents, but these do not always lead to the result hoped for.

EP-A-0 321 919 describes the preparation of pigment formulations by mixing the base pigments with pigment derivatives containing methyleneimidazolyl groups. In the field of perylene pigments, pigment formulations with coloristic properties which no longer meet current requirements are obtained.

DE-A-3 160 906 describes the preparation of pigment-dispersing agents containing sulfonamide groups. However, the pigment-dispersing agents based on perylene compounds described therein have considerable coloristic and rheological deficiencies.

U.S. Pat. No. 4,762,569 describes the preparation of pigment formulations based on symmetrical perylene-3,4,9,10-tetracarboxylic acid diimides. These pigment formulations are suitable only for use in solvent-containing systems. They do not meet all the requirements imposed on pigment formulations in respect of rheological and coloristic properties. In particular, the coloristic properties are no longer adequate at high pigment-dispersing agent contents, and in many cases a significant loss of gloss and a deviation in color shade are detectable. These pigment-dispersing agents furthermore have an inadequate fastness to solvents and overpainting, as a result of which their use is limited.

There was therefore the object of providing pigment formulations which overcome the above disadvantages of the prior art in respect of coloristic properties, rheology and universal applicability.

It has been found that the object is achieved, surprisingly, by pigment formulations which, in addition to the base pigment, comprise one or more unsymmetrical perylene-3,4,9,10-tetracarboxylic acid diimides.

The invention relates to pigment formulations comprising a content of
a) at least one organic pigment from the class of perylene, perinone, quinacridone, azo, benzimidazolone, anthraquinone or anthanthrone pigments and
b) at least one pigment-dispersing agent of the formula (I),

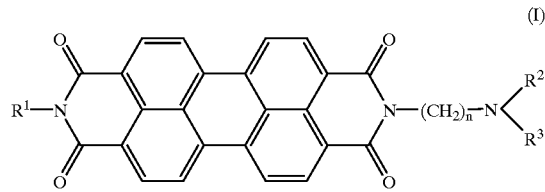

in which $R^1$ is a hydrogen atom, hydroxyl, amino or an alkyl group having 1 to 8 carbon atoms, which is optionally substituted by 1 to 4 chlorine or bromine atoms, by a phenyl, cyano, hydroxyl, carbamoyl, $C_2$–$C_4$-acyl or $C_1$–$C_4$-alkoxy group, or which is perfluorinated or partly fluorinated;

$R^2$ and $R^3$ independently of one another are a hydrogen atom, a substituted or unsubstituted or partly fluorinated or perfluorinated alkyl group having 1 to 20 carbon atoms, or a substituted or unsubstituted or partly fluorinated or perfluorinated alkenyl group having 2 to 20 carbon atoms, it being possible for the substituents to be hydroxyl, phenyl, cyano, chlorine, bromine, $C_2$–$C_4$-acyl or $C_1$–$C_4$-alkoxy, and to be preferably 1 to 4 in number, or $R^2$ and $R^3$, together with the N atom, form a saturated, unsaturated or aromatic heterocyclic ring, which optionally contains a further nitrogen, oxygen or sulfur atom in the ring; and n is a number from 1 to 6.

Preferred pigment-dispersing agents in the context of the present invention are those of the formula (I) in which $R^1$ is a hydrogen atom, benzyl, a $C_1$–$C_6$-alkyl group, or a $C_2$–$C_6$-alkyl group which is substituted by 1 or 2 substituents selected from the group consisting of hydroxyl, amino, acetyl, methoxy, ethoxy, chlorine and bromine;

$R^2$ and $R^3$ independently of one another are a hydrogen atom, a $C_1$–$C_6$-alkyl group, or a $C_1$–$C_6$-alkyl group which is substituted by 1 or 2 substituents selected from the group consisting of hydroxyl, acetyl, methoxy, ethoxy, chlorine and bromine, or $R^2$ and $R^3$, together with the adjacent N atom, form an imidazolyl, piperidinyl, morpholinyl, pipecolinyl, pyrrolyl, pyrrolidinyl, pyrazolyl or piperazinyl ring, and n is the number 2 or 3.

Pigment formulations for non-aqueous systems which have acquired particular interest according to the invention are those which comprise, as the pigment-dispersing agent, at least one perylene compound of the formula (I) in which $R^1$ is methyl or ethyl, $R^2$ and $R^3$ are each methyl or ethyl and n is the number 3.

Pigment formulations which have acquired particular interest for aqueous systems are those which comprise, as the pigment-dispersing agent, at least one perylene compound of the formula (I) in which $R^1$ is hydrogen or a hydroxyethylene group, $R^2$ and $R^3$ are each methyl or ethyl and n is the number 3, or $R^2$ and $R^3$, together with the adjacent nitrogen atom, form an imidazolyl radical or morpholinyl radical and n is the number 3.

The perylene compounds of the formula I employed according to the invention as pigment-dispersing agent b) are known compounds. They can be prepared according to DE-A-3 017 185, for example, by reaction of perylene-3,4,9,10-tetracarboxylic acid monoanhydride monoimides of the formulae (II) or (III)

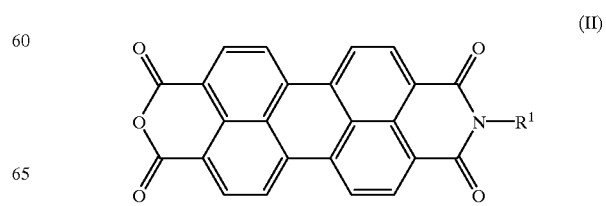

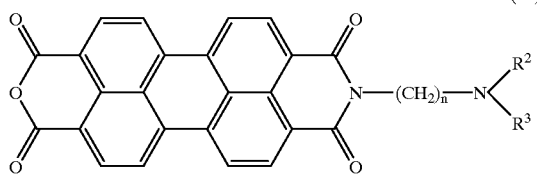

with an amine of the formula (IV) or (V) respectively

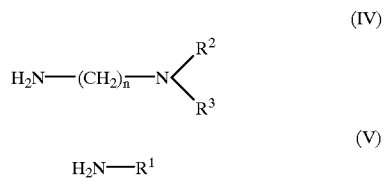

in which $R^1$, $R^2$, $R^3$ and n have the abovementioned meanings, either (II) being reacted with (IV), or (III) being reacted with (V) to give the compound of the formula (I).

The condensation reaction is usually carried out in aqueous solution under alkaline pH conditions at temperatures in the range between 50 and 180° C. The amines are expediently employed in excess here. The compounds of the formula (I) formed are isolated from the reaction mixture by filtration. Instead of in an aqueous medium, the condensation reaction between the two reaction partners can also be carried out in an organic or aqueous-organic medium in inert organic solvents.

Examples of amines of the formula (IV) which can be employed are dimethylaminoethylamine, diethylaminoethylamine, 2-ethylhexylaminoethylamine, stearylaminoethylamine, oleylaminoethylamine, dimethylaminopropylamine, dibutylaminopropylamine, diethylaminobutylamine, dimethylaminoamylamine, diethylaminohexylamine, piperidinomethylamine, piperidinoethylamine, piperidinopropylamine, pipecolinoethylamine, pipecolinopropylamine, imidazolopropylamine, morpholinoethylamine and morpholinopropylamine.

Examples of amines of the formula (V) which can be employed are $NH_3$, methylamine, ethylamine, n-propylamine, n-butylamine, n-hexylamine, β-hydroxyethylamine, hydroxylamine and hydrazine.

Examples of preferred organic pigments in the context of the present invention are C.I. Pigment Red 123 (C.I. No. 71145), C.I. Pigment Red 149 (C.I. No. 71137), C.I. Pigment Red 178 (C.I. No. 71155), C.I. Pigment Red 179 (C.I. No. 71 130), C.I. Pigment Red 190 (C.I. 71 140), C.I. Pigment Red 224 (C.I. No. 71 127), C.I. Pigment Violet 29 (C.I. No. 71 129); C.I. Pigment Orange 43 (C.I. No. 71 105), C.I. Pigment Red 194 (C.I. No. 71 100); C.I. Pigment Violet 19 (C.I. No. 73 900), C.I. Pigment Red 122 (C.I. No. 73 915); C.I. Pigment Red 209 (C.I. No. 73 905); C.I. Pigment Yellow 147, C.I. Pigment Red 168 (C.I. No. 59 300); C.I. Pigment Yellow 120 (C.I. No. 11 783); C.I. Pigment Yellow 151 (C.I. No. 13 980), C.I. Pigment Brown 25 (C.I. No. 12 510), C.I. Pigment Violet 32 (C.I. No. 12 517), C.I. Pigment Red 170 (C.I. No. 12 475), C.I. Pigment Orange 38 (C.I. No. 12 367), C.I. Pigment Red 188 (C.I. No. 12 467), C.I. Pigment Red 187 (C.I. No. 12 486), C.I. Pigment Orange 34 (C.I. No. 21 115), C.I. Pigment Orange 13 (C.I. No. 21 110), C.I. Pigment Red 9 (C.I. No. 12 460), C.I. Pigment Red 2 (C.I. No.12 310), C.I. Pigment Red 112 (C.I. No. 12 340), C.I. Pigment Red 7 (C.I. No. 12 420), C.I. Pigment Red 210 (C.I. No. 12 477), and C.I. Pigment Red 12 (C.I. No. 12 385).

The amount of pigment-dispersing agents b) in the pigment formulations according to the invention is not limited, as long as the required pigment quality is not adversely influenced, but in general a content of 0.5 to 20% by weight, in particular of 1 to 10% by weight, of pigment-dispersing agent, calculated with respect to the total weight of the pigment formulation, is appropriate.

In addition to pigment a) and pigment-dispersing agent b), the pigment formulations according to the invention can also comprise further constituents, such as, for example, surface-active agents, resins, defoamers, anti-dusting agents, extenders or other customary additives.

Pigment formulations in the context of the present invention preferably comprise a) 99.5 to 80% by weight of at least one organic pigment selected from the class consisting of perylene, perinone, quinacridone, benzimidazolone, azo, anthraquinone or anthanthrone pigments, b) 0.5 to 20% by weight, preferably 1 to 10% by weight, of at least one perylene compound of the formula (I), c) 0 to 10% by weight of surface-active agents and d) 0 to 10% by weight of customary additives, the proportions of the particular components being based on the total weight of the formulation (100% by weight).

Possible surface-active agents are customary anionic, cationic or nonionic surfactants, for example anionic substances, such as fatty acid taurides, fatty acid N-methyltaurides, fatty acid isethionates, alkylbenzenesulfonates, alkylnaphthylenesulfonates, alkylphenol polyglycol ether-sulfates and fatty alcohol polyglycol ether-sulfates; fatty acids, for example palmitic, stearic and oleic acid; soaps, for example alkali metal salts of fatty acids, naphthenic acids and resin acids, for example abietic acid, and alkali-soluble resins, for example colophony-modified maleate resins; cationic substances, such as quaternary ammonium salts, fatty amine oxyethylates, fatty amine polyglycol ethers and fatty amines; and nonionic substances, such as fatty alcohol polyglycol ethers, fatty alcohol polyglycol esters and alkylphenolpolyglycol ethers.

Examples of possible customary additives are defoamers, extenders, fillers, standardizing agents, preservatives, drying retardants and foam-reducing agents.

The pigment formulations according to the invention are as a rule free-flowing powders or granules.

The dispersing effect which can be achieved according to the invention is presumably based on a modification of the surface structure of the organic pigments a) with the perylene compounds of the formula (I). Thus, in some cases, the activity of the pigment-dispersing agents and the quality of the pigment formulations produced with them depends on the time of addition of the dispersing agent in the preparation process of the organic pigment. The nature and manner of the application of the pigment-dispersing agent can also have an influence.

The pigment formulations according to the invention can be both mixtures of several, expediently two, organic pigments with in each case one pigment-dispersing agent, and mixtures of one organic pigment with several pigment-dispersing agents.

The invention also relates to a process for the preparation of a pigment formulation according to the invention, which comprises allowing the pigment-dispersing agent and the organic pigment to act on one another at any desired point in time in its preparation process.

The preparation process of an organic pigment comprises its synthesis, if appropriate fine division, for example by grinding or reprecipitation, if appropriate finishing with solvent, and isolation as a press-cake or as a dry powder. For example, the pigment-dispersing agents can be added before or during the pigment synthesis or before or during a fine division process or a subsequent solvent treatment (finishing). Temperatures of 0 to 200° C. may occur here. The pigment-dispersing agent can of course also be added in part portions at various times.

Addition in the context of a fine division process is carried out, for example, in the course of dry grinding of the crude pigment, with or without additional grinding auxiliaries, on a roll or vibratory mill, or in the course of wet grinding of the crude pigment in an aqueous, aqueous-organic or organic grinding medium, for example on a bead mill.

The addition of the pigment-dispersing agents before or during finishing off the organic pigment in an aqueous, aqueous-alkaline, aqueous-organic or organic medium has proved to be equally appropriate.

The pigment-dispersing agents can also be added to and incorporated into the water-moist pigment press-cake before drying, in which case the pigment-dispersing agent itself can also be in the form of a press-cake.

It is furthermore possible to carry out drymixing of pulverulent pigment-dispersing agents with the pigment powder.

It is moreover possible to synthesize the pigment-dispersing agent and a perylene pigment as a mixture by reaction with the same amine of the formula (IV) or (V).

It was surprising and not foreseeable that the unsymmetric perylene-3,4,9,10-tetracarboxylic acid diimides have outstanding and superior pigment-dispersing agent properties, since, in contrast to the pigment-dispersing agents described in U.S. Pat. No. 4,762,569, they have only one basic group per molecule and the activity of pigment-dispersing agents usually decreases as the number of basic groups is lowered. Furthermore, the pigment-dispersing agents used according to the invention have improved fastness properties and are suitable for use both in solvent-containing and in aqueous systems.

The pigment formulations obtainable according to the present invention are distinguished by their outstanding coloristic and rheological properties, in particular by a high stability to flocculation, an easy dispersibility, good gloss properties and a high tinctorial strength.

The pigment formulations prepared according to the invention can be employed for pigmenting (coloring) high molecular weight organic materials of natural or synthetic origin.

Examples of high molecular weight organic materials which can be pigmented with the pigment formulations mentioned are cellulose ethers and esters, such as ethylcellulose, nitrocellulose, cellulose acetate or cellulose butyrate, naturally occurring resins or synthetic resins, such as addition polymerization resins or condensation resins, for example aminoplasts, in particular urea- and melamine-formaldehyde resins, alkyd resins, acrylic resins, phenoplasts, polycarbonates, polyolefins, such as polystyrene, polyvinyl chloride, polyethylene and polypropylene, polyacrylonitrile, polyacrylic acid esters, polyamides, polyurethanes or polyesters, rubber, casein, silicone and silicone resins, individually or in mixtures.

It is of no importance here whether the high molecular weight organic compounds mentioned are in the form of plastic compositions or melts or in the form of spinning solutions, coatings, paints or printing inks. Depending on the intended use, it proves advantageous to use the pigment formulations obtained according to the invention as a blend or in the form of preparations or dispersions. The pigment formulations according to the invention are employed in an amount of preferably 0.1 to 10% by weight, based on the high molecular weight organic material to be pigmented.

It is also possible for the pigment-dispersing agent to be added to the pigment, or vice versa, only in the use medium. The invention therefore also relates to a pigment preparation essentially comprising said organic pigment, said pigment-dispersing agent, said high molecular weight organic material, in particular coating, if appropriate a surface-active agent and/or further customary additives. The total amount of organic pigment plus pigment-dispersing agent is preferably 1 to 10% by weight, based on the total weight of the pigment preparation.

To evaluate the properties of the pigment formulations prepared according to the invention in the coating sector, an aromatic-containing alkyd melamine resin coating (AM) based on a medium-oil alkyd resin and a butanol-etherified melamine resin, a polyester coating (PE) based on cellulose acetobutyrate and a melamine resin, a high-solids acrylic resin stoving enamel based on a non-aqueous dispersion (HS) and an aqueous coating based on polyurethane (PUR) were chosen from the large number of known coatings.

The tinctorial strength and the color shade were determined in accordance with DIN 55986. The rheology of the ground material after the dispersing operation (millbase rheology) was evaluated on the following five-level scale:

| 5 | thinly liquid |
| 4 | liquid |
| 3 | viscous |
| 2 | slightly congealed |
| 1 | congealed |

After the ground material had been diluted to the final pigment concentration, the viscosity was evaluated with a Viscospatula according to Rossmann, Type 301 from Erichsen.

Gloss measurements were made on cast films at an angle of 20° in accordance with DIN 67530 (ASTMD 523) with the "multigloss" gloss meter from Byk-Mallinckrodt.

The fastness to solvents was determined in accordance with DIN 55976. The fastness to overcoating was determined in accordance with DIN 53221. The crystal phase of the pigments and pigment formulations was determined by X-ray spectroscopy. The X-ray spectra were recorded with Cu Kα radiation.

In the following examples, the parts are in each case parts by weight and the percentages are in each case percentages by weight of the substances thus described.

EXAMPLE 1

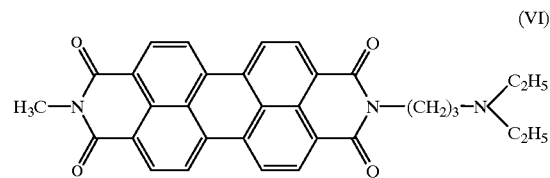

(VI)

360 parts of water are initially introduced into an autoclave, 24.3 parts of perylene-3,4,9,10-tetracarboxylic acid monoanhydride monomethylimide are introduced and 31.2 parts of N,N-diethylaminopropylamine are added. The mixture is then heated to 150° C. under pressure and stirred at 150° C. for 5 hours. After cooling to 25° C., the pigment-dispersing agent is filtered off with suction, washed neutral with water and dried at 80° C.

27.4 parts of pigment-dispersing agent of the formula (VI) are obtained.

Analysis:

Calculated: 74.3% C, 5.2% H, 8.1% N, 12.4% O

Found: 73.4% C, 5.0% H, 8.1% N, 12.4% O

The $^1$H- and the $^{13}$C-NMR spectra agree with the structural formula given above.

EXAMPLE 1a 3000 parts of water are initially introduced into a stirred vessel and 540 parts of a 27.8% pure filter cake of perylene-3,4,9,10-tetracarboxylic acid dianhydride are introduced, while stirring. 16 parts of a commercially available 50% strength aqueous resin soap are added to this suspension and, after cooling to 0 to 5° C., 222 parts of a 45.5% strength aqueous monomethylamine solution are added dropwise in the course of 10 minutes. The mixture is stirred at 0 to 5° C. for a further 15 minutes. A solution of 84.9 parts of anhydrous calcium chloride in 250 parts of water is added dropwise to the resulting solution at 0 to 5° C. in the course of 15 minutes and the mixture is stirred at 0 to 5° C. for 1 hour. The suspension is heated to 80° C. and stirred at 80° C. for 1 hour until the cyclization reaction has ended. Thereafter, a suspension of 8 parts of distearyldimethylammonium chloride and 350 parts of water is added dropwise and the mixture is stirred at 80° C. for one hour. After cooling to 50° C., 98% strength formic acid is added dropwise at this temperature until a pH of 7 is reached. The mixture is stirred at 50° C. for ½ hour and the pigment obtained is filtered off with suction, washed with water until free from chlorine ions and dried at 80° C. in a circulating air cabinet. 172.3 parts of C.I. Pigment Red 179 (C.I. No. 71 130) are obtained. 19 parts of the above pigment are mixed mechanically with 1 part of pigment-dispersing agent of the formula (VI), prepared according to Example 1.

A pigment formulation which gives transparent and strong-colored coating films in the AM coating is obtained. The rheology is evaluated as 5 and the viscosity is 13.6 s. The fastness to overcoating and the fastness to solvents are very good.

Without the addition of the pigment-dispersing agent, the coating films are significantly weaker in color. The rheology is evaluated as 1 and the viscosity is so high that it can no longer be measured with the Viscospatula.

EXAMPLE 1b

Comparison Example 19 parts of the above pigment are mixed mechanically with 1 part of pigment-dispersing agent prepared according to Example 1 of U.S. Pat. No. 4,762,569.

A pigment formulation which is indeed transparent in the AM coating and gives strong-colored coating films, but with which the fastness to overcoating and fastness to solvents are inadequate is obtained. The full shade coating film has a significant haze. Because of the coloristic deficiencies, this pigment formulation is significantly inferior to that from Example 1a.

EXAMPLE 1c

Cyclization and hydrolysis:

150 parts of 2,5-dianilinoterephthalic acid are introduced into 750 parts of polyphosphoric acid, which contains >84% of $P_2O_5$, at 80 to 90° C., while stirring, and the mixture is heated at 125° C. for 1 hour, cyclization to the quinacridone taking place. Thereafter, the reaction mixture is hydrolyzed with 3375 parts of phosphoric acid, 13.9% strength, at a temperature of 80° C., while stirring. During this operation, the temperature rises to 105° C. The mixture is stirred at 105° C. for 1 hour. Thereafter, the crude pigment is filtered off with suction and washed neutral. 734 parts of an 18.0% pure crude pigment filter-cake, which is predominantly in the α-phase, are obtained.

Phase conversion:

694.5 parts of the crude pigment filter-cake are introduced into a stirred vessel. 680.5 parts of water, 12.9 parts of sodium hydroxide (98% pure) and 375 parts of isobutanol (100% pure) are added and the mixture is heated at 150° C. under pressure for 5 hours. After cooling to 90° C., the isobutanol is distilled off azeotropically up to 100° C. at the transition point. The suspension is cooled to 60° C. and the crude pigment is filtered off with suction, washed neutral with water and dried at 80° C. 115.7 parts of highly crystalline crude pigment which is in the β-phase are obtained.

Grinding:

A suspension comprising 77 parts of sodium hydroxide solution, 1% strength, 6.3 parts of the coarsely crystalline quinacridone crude pigment described above (β-phase) and 0.32 part of pigment-dispersing agent of the formula (VI), prepared according to Example 1, is metered into a stirred ball mill (type PML, manufacturer: Draiswerke GmbH, Mannheim) filled with 354 parts of zirconium mixed oxide beads of diameter 0.3–0.4 mm as grinding bodies, and is ground with a stirrer peripheral speed of 15.6 m/s and a specific power density of 3.1 kW per liter of grinding space at 25° C. for 15 minutes. The ground suspension is then sieved off from the grinding bodies, the grinding bodies are rinsed with water and the combined ground suspensions are filtered off with suction, washed with water and dried at 80° C.

6.2 parts of a pigment formulation based on C.I. Pigment Violet 19 (C.I. No. 73 900), which gives transparent and strong-colored coating films with a deep color shade in the AM coating, are obtained. The rheology is evaluated as 5. The viscosity is 3.1 s and the gloss measurement gives the value 78.

Without the addition of the pigment-dispersing agent, the coating films are significantly paler and weaker in color.

EXAMPLE 1d 30 parts of coarsely crystalline perylene crude pigment (C.I. Pigment Red 149, C.I. No. 71 137) (prepared according to DE-A-1 067 157), 150 parts of anhydrous sodium sulfate and 1.6 parts of pigment-dispersing agent of the formula (VI), prepared according to Example 1, are introduced into a steel container filled to the extent of 80% by volume with 1400 parts of steatite beads of diameter 12 mm as grinding bodies, and are ground on a vibratory mill (type Vibratom, manufacturer; Siebtechnik, Mühlheim) for 8 hours at 1400 revolutions per minute with an oscillating circle of 4 mm. The ground material is then sieved off from the grinding bodies. The ground material is introduced into 1500 parts of water and the mixture is stirred at 80° C. for 1 hour. Thereafter, the pigment formulation is filtered off with suction, washed with water until free from salts and dried at 80° C.

27.8 parts of a pigment formulation based on C.I. Pigment Red 149 is obtained. In the AM coating, transparent and strong-colored coating films are obtained. The fastness to overcoating is very good.

EXAMPLE 1e 4.5 parts of the quinacridone pigment C.I. Pigment Red 122 (C.I. No. 73 915) are mixed mechanically with 0.045 part of pigment-dispersing agent of the formula (VI), prepared according to Example 1.

A pigment formulation which gives transparent and strong-colored coating films in the AM coating is obtained. The rheology is evaluated as 5 and the viscosity is 4.9 s. The fastness to overcoating is very good.

EXAMPLE 1f 9.5 parts of the perylene pigment C.I. Pigment Red 149 (C.I. No. 71 137) are mixed mechanically with 0.5 part of pigment-dispersing agent of the formula (VI), prepared according to Example 1.

A pigment formulation which gives transparent and strong-colored coating films in the AM coating is obtained. The viscosity is 9.5 s. The gloss measurement gives the value 91.

Without the addition of the pigment-dispersing agent, the coating films are more opaque, paler and weaker in color and the gloss measurement gives the value 7. The viscosity is 33.1 s.

EXAMPLE 1g

Comparison Example 9.5 parts of the perylene pigment C.I. Pigment Red 149 are mixed mechanically with 0.5 part of pigment-dispersing agent, prepared according to Example 1 of U.S. Pat. No. 4,762,569.

A pigment formulation, of which the rheology in the AM coating is evaluated as 1 and of which the viscosity is 120 s, is obtained. The gloss measurement gives the value 5. This pigment formulation is significantly inferior in its coloristic and rheological properties to that according to Example 1 f.

EXAMPLE 1h 9.5 parts of the perylene pigment C.I. Pigment Red 224 (C.I. No. 71 127) are mixed mechanically with 0.5 part of the pigment-dispersing agent of the formula (VI), prepared according to Example 1.

A pigment formulation which gives transparent and strong-colored coating films with a deep color shade in the AM coating is obtained. The rheology is evaluated as 5 and the viscosity is 2.8 s.

EXAMPLE 1i 4.75 parts of the benzimidazolone pigment C.I. Pigment Violet 32 (C.I. 12 517) are mixed mechanically with 0.25 part of pigment-dispersing agent of the formula (VI), prepared according to Example 1.

A pigment formulation which gives transparent and strong-colored coating films in the AM coating is obtained. The rheology is evaluated as 5 and the viscosity is 3.7 s.

Without the addition of the pigment-dispersing agent, the coating films are significantly more opaque, paler, weaker in color and highly flocculated.

EXAMPLE 1j 19.5 parts of the anthanthrone pigment C.I. Pigment Red 168 (C.I. No. 59 300) are mixed mechanically with 0.5 part of pigment-dispersing agent of the formula (VI), prepared according to Example 1.

A pigment formulation which gives transparent and strong-colored coating films in the AM coating is obtained. The rheology is evaluated as 5 and the viscosity is 3.3 s.

Without the addition of the pigment-dispersing agent, the coating films are significantly more opaque, paler and weaker in color.

EXAMPLE 1k 9.5 parts of the benzimidazolone pigment C.I. Pigment Brown 25 (C. I. No. 12 510) are mixed mechanically with 0.5 part of the pigment-dispersing agent of the formula (VI), prepared according to Example 1.

A pigment formulation which gives transparent and strong-colored coating films in the AM coating is obtained. The viscosity is 5.2 s. Without the addition of the pigment-dispersing agent, the coating films are significantly weaker in color.

EXAMPLE 1l 9.5 parts of the perinone pigment C.I.Pigment Red 194 (C.I. No. 71 100) are mixed mechanically with 0.5 part of the pigment-dispersing agent of the formula (VI), prepared according to Example 1.

A pigment formulation which gives opaque and strong-colored coating films in the AM coating is obtained. The rheology is evaluated as 5 and the viscosity is 3.7 s.

EXAMPLE 2

400 parts of o-dichlorobenzene are initially introduced into a stirred vessel, 40.5 parts of perylene-3,4,9,10-tetracarboxylic acid monoanhydride monomethylimide are introduced and 52.1 parts of N,N-diethylaminopropylamine are added. The mixture is then heated to 150° C. and stirred at 150° C. for 5 hours. Thereafter, it is cooled to 100° C. and the o-dichlorobenzene is distilled off with steam. After cooling to 60° C., the pigment-dispersing agent is filtered off with suction, washed neutral with water and dried at 80° C.

50.6 parts of pigment-dispersing agent of the formula (VI) are obtained. Analysis:

Calculated: 8.1% N

Found: 8.1% N

EXAMPLE 2a 18 parts of pigment prepared according to Example 1a are mixed mechanically with 2 parts of the pigment-dispersing agent of the formula (VI), prepared according to Example 2.

A pigment formulation based on C.I. Pigment Red 179 which gives transparent and strong-colored coating films in the AM coating is obtained. The rheology is evaluated as 5 and the viscosity is 5.2 s. The fastness to overcoating and the fastness to solvents are very good.

Without the addition of the pigment-dispersing agent, the coating films are significantly weaker in color. The rheology is evaluated as 1 and the viscosity is so high that it can no longer be measured with the Viscospatula.

EXAMPLE 3

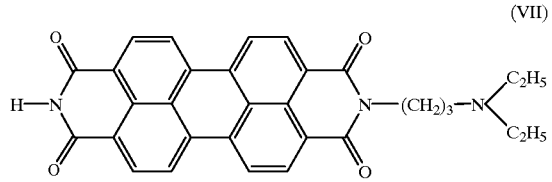

(VII)

300 parts of water are initially introduced into an autoclave, 15.6 parts of perylene-3,4,9,10-tetracarboxylic acid monoanhydride monoimide are introduced and 20.8 parts of N,N-diethylaminopropylamine are added. The mixture is then heated to 150° C. under pressure and stirred at 150° C. for 5 hours. After cooling to 25° C., the pigment-dispersing agent is filtered off with suction, washed neutral with water and dried at 80° C.

18.1 parts of pigment-dispersing agent of the formula (VII) are obtained.

Analysis:
Calculated: 74.0% C, 5.0% H, 8.3% N, 12.7% O
Found: 73.9% C, 5.4% H, 8.4% N, 13.1% O

EXAMPLE 3a 9.5 parts of the quinacridone pigment C.I. Pigment Violet 19 (C.I. No. 73 900) are mixed mechanically with 0.5 part of the pigment-dispersing agent of the formula (VII), prepared according to Example 3.

A pigment formulation which gives transparent and strong-colored coating films in the AM coating is obtained. The rheology is evaluated as 5 and the viscosity is 4.0 s.

EXAMPLE 4

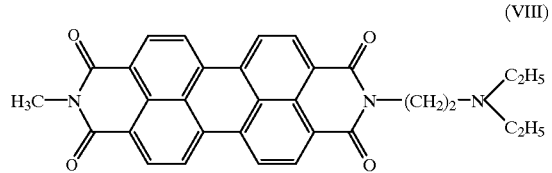

(VIII)

150 parts of N,N-diethylaminoethylamine are initially introduced into a stirred vessel and 10.1 parts of perylene-3,4,9,10-tetracarboxylic acid monoanhydride monomethylimide are introduced. The mixture is then heated to 140° C. and stirred at 140° C. for 2 hours. After cooling to 25° C., 100 parts of water are added and the pigment-dispersing agent is filtered off with suction and washed neutral with water. The filter-cake is introduced into 200 parts of 1% strength potassium hydroxide solution and the mixture is heated to 90° C. and stirred at this temperature for 1 hour. Thereafter, the solid is filtered off with suction at 90° C. and washed with hot 1% strength potassium hydroxide solution until the runnings are colorless. The pigment-dispersing agent is then washed neutral with water and dried at 80° C.

11.7 parts of pigment-dispersing agent of the formula (VIII) are obtained.

Analysis:
Calculated: 74.0% C, 5.0% H, 8.4% N, 12.7% O
Found: 74.5% C, 5.3% H, 8.3% N, 12.9% O

EXAMPLE 4a 19 parts of the perylene pigment C.I. Pigment Red 149 (C.I. No. 71 137) are mixed mechanically with 1 part of the pigment-dispersing agent of the formula (VIII), prepared according to Example 4.

A pigment formulation which gives transparent and strong-colored coating films in the AM coating is obtained. The dispersibility is very good.

EXAMPLE 5

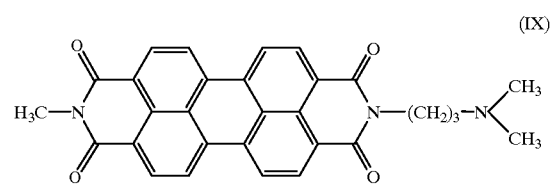

(IX)

785 parts of water are initially introduced into a stirred vessel and 50 parts of perylene-3,4,9,10-tetracarboxylic acid monoanhydride mono-N',N'-dimethyl-aminopropylimide in the form of the moist filter-cake are introduced, while stirring, and the mixture is cooled to 0 to 5° C. 83.9 parts of a 40% strength aqueous monomethylamine solution are added dropwise to this suspension at 0 to 5° C. in the course of 10 minutes. The mixture is stirred at 0 to 5° C. for a further 15 minutes. A solution of 28.3 parts of anhydrous calcium chloride in 94.3 parts of water is added dropwise to the resulting solution at 0 to 5° C. in the course of 15 minutes and the mixture is stirred at 0 to 5° C. for 1 hour. The suspension is heated to about 75° C. and stirred at 75° C. for 2 hours, until the cyclization reaction has ended. After cooling to 50° C., 98% strength formic acid is added dropwise at this temperature until a pH of 7 is reached. The mixture is stirred at 50° C. for ½ hour and the pigment-dispersing agent obtained is filtered off with suction and washed with water until free from chlorine ions.

181.4 parts of a filter-cake containing 25.2% of pigment-dispersing agent of the formula (IX) are obtained.

Analysis:
Calculated: 8.6% N
Found: 8.1% N

The $^1$H- and the $^{13}$C-NMR spectra agree with the structural formula given above.

EXAMPLE 5a 1030 parts of water are initially introduced into a stirred vessel and 140.6 parts of a press-cake comprising 32.4% of perylene-3,4,9,10-tetracarboxylic acid dianhydride are introduced, while stirring. After cooling to 0 to 5° C., 94.4 parts of a 40.0% strength aqueous monomethylamine solution are added dropwise in the course of 10 minutes. The mixture is stirred at 0 to 5° C. for a further 15 minutes. A solution of 25.5 parts of anhydrous calcium chloride in 85 parts of water is added dropwise to the resulting solution at 0 to 5° C. in the course of 15 minutes and the mixture is stirred at 0 to 5° C. for 1 hour. The suspension is heated to 80° C. and stirred at 80° C. for 1 hour, until the cyclization reaction has ended. Thereafter, a suspension comprising 21 parts of the pigment-dispersing agent, 25.2% pure, of the formula (IX), prepared according to Example 5, and 100 parts of water is added. 166 parts of isobutanol, 100% pure, are then added dropwise, the mixture is stirred at the boiling point for 2 hours and the isobutanol is then distilled off up to 100° C. at the transition point. After cooling to 50° C., 98% strength formic acid is added dropwise at this temperature, until a pH of 7 is reached. The mixture is stirred at 50° C. for ½ hour and the pigment obtained is filtered off with suction, washed with water until free from chlorine ions and dried at 80° C. in a circulating air cabinet.

52.6 parts of a pigment formulation based on C.I. Pigment Red 179 are obtained. Transparent and strong-colored coating films are obtained in the HS coating. The metallic coating film is strong-colored and brilliant.

EXAMPLE 6

150 parts of N,N-dimethylaminopropylamine are initially introduced into a stirred vessel and 10.1 parts of perylene-3,4,9,10-tetracarboxylic acid monoanhydride monomethylimide are introduced. The mixture is then heated to 125° C. and stirred at 125° C. for 5 hours. After cooling to 25° C., 250 parts of water are added and the pigment-dispersing agent is filtered off with suction and washed neutral with water. The filter-cake is introduced into 200 parts of 1% strength potassium hydroxide solution and the mixture is heated to 90° C. and stirred at this temperature for 1 hour. Thereafter, the solid is filtered off with suction at 90° C. and washed with hot 1% strength potassium hydroxide solution until the runnings are colorless. It is then washed neutral with water and dried at 80° C.

10.4 parts of pigment-dispersing agent of the formula (IX) are obtained.

Analysis:
Calculated: 73.6% C, 4.7% H, 8.6% N, 13.2% O
Found: 74.3% C, 4.6% H, 8.4% N, 12.6% O

EXAMPLE 6a 4600 parts of water are initially introduced into a stirred vessel and 613.5 parts of a filter-cake comprising 32.0% of perylene-3,4,9,10-tetracarboxylic acid dianhydride are introduced, while stirring. 21.4 parts of a commercially available 50% strength aqueous resin soap are added to this suspension and, after cooling to 0 to 5° C., 420 parts of a 40.0% strength aqueous monomethylamine solution are added dropwise in the course of 10 minutes. The mixture is stirred at 0 to 5° C. for a further 15 minutes. A solution of 113.2 parts of anhydrous calcium chloride in 377 parts of water is added dropwise to the resulting solution at 0 to 5° C. in the course of 15 minutes and the mixture is stirred at 0 to 5° C. for 1 hour. The suspension is heated to 80° C. and stirred at 80° C. for 2 hours, until the cyclization reaction has ended. After cooling to 50° C., 98% strength formic acid is added dropwise at this temperature until a pH of 7 is reached. The mixture is stirred at 50° C. for ½ hour and the resulting pigment is filtered off with suction, washed with water until free from chlorine ions and dried at 80° C. in a circulating-air cabinet.

218 parts of C.I. Pigment Red 179 are obtained.

9.5 parts of the above pigment are mixed mechanically with 0.5 part of the pigment-dispersing agent of the formula (IX), prepared according to Example 6.

A pigment formulation based on C.I. Pigment Red 179 which gives transparent and strong-colored coating films in the AM coating is obtained. The rheology is evaluated as 5 and the viscosity is 3.5 s. The fastness to overcoating is very good.

Without the addition of the pigment-dispersing agent, the coating films are matte and weak in color.

EXAMPLE 7

1500 parts of water are initially introduced into an autoclave, 101.3 parts of perylene-3,4,9,10-tetracarboxylic acid monoanhydride monomethylimide are introduced and 51.1 parts of N,N-dimethylaminopropylamine are added. The mixture is then heated to 150° C., under pressure, and stirred at 150° C. for 5 hours. After cooling to 25° C., the pigment-dispersing agent is filtered off with suction, washed neutral with water and dried at 80° C.

342.5 parts of a filter-cake comprising 35.3% of pigment-dispersing agent of the formula (IX) are obtained.

Analysis:
Calculated: 73.6% C, 4.7% H, 8.6% N, 13.1% O
Found: 72.6% C, 5.5% H, 8.3% N, 14.1% O

EXAMPLE 7a 189 parts of water are initially introduced into an autoclave, 85.9 parts of a filter-cake comprising 32.0% of perylene-3,4,9,10-tetracarboxylic acid dianhydride are introduced, and 2.5 parts of a commercially available 50% strength aqueous resin soap and 27.5 parts of aqueous ammonia solution, 25.0% strength, are added in succession. The mixture is then heated to 130° C., under pressure, and stirred at 130° C. for 3 hours. After cooling to 25° C., a pH of 1.5 is established by addition of 20.0 parts of 10% strength hydrochloric acid. Thereafter, the pigment is filtered off with suction and washed neutral with water.

126.5 parts of a filter-cake comprising 23.2% of the pigment C.I. Pigment Violet 29 (C.I. No. 71 129) are obtained.

38.6 parts of this filter-cake and 2.8 parts of a filter-cake comprising 35.3% of the pigment-dispersing agent of the formula (IX), prepared according to Example 7, are mixed and the mixture is dried at 80° C. 10 parts of a pigment formulation are obtained.

Opaque and strong-colored coating films are obtained in the AM coating. The rheology is evaluated as 5 and the viscosity is 4.0 s.

EXAMPLE 7b 1141 parts of water are initially introduced into a stirred vessel and 148.4 parts of a 32% pure filter-cake of perylene-3,4,9,10- tetracarboxylic acid dianhydride and 10.7 parts of a 23.4% pure filter-cake of perylene-3,4,9,10-tetracarboxylic acid monoanhydridemono-N,N-dimethyl-aminopropylimide are introduced in succession, while stirring. The suspension is cooled to 0 to 5° C. and 104.9 parts of a 40.0% strength aqueous monomethylamine solution are added dropwise at this temperature in the course of 10 minutes. The mixture is stirred at 0 to 5° C. for a further 15 minutes. A solution of 28.3 parts of anhydrous calcium chloride in 94.3 parts of water is added dropwise to the resulting solution at 0 to 5° C. in the course of 15 minutes and the mixture is stirred at 0 to 5° C. for 1 hour. The suspension is heated to 80° C. and stirred at 80° C. for 1 hour, until the cyclization reaction has ended. After cooling to 50° C., 98% strength formic acid is added dropwise at this temperature, until a pH of 7 is reached. The mixture is stirred at 50° C. for ½ hour and the resulting pigment formulation is filtered off with suction, washed with water until free from chlorine ions and dried at 80° C. in a circulating air cabinet.

53.0 parts of a pigment formulation based on C.I. Pigment Red 179 are obtained. The pigment-dispersing agent in the pigment formulation has the structure of the formula (IX). Transparent and strong-colored coating films are obtained in the PUR coating.

EXAMPLE 7c 1144 parts of water are initially introduced into a stirred vessel and 156.3 parts of a 32% pure filter-cake of perylene- 3,4,9,10-tetracarboxylic acid dianhydride and 4.5 parts of an aqueous solution of the sodium salt of an alkylsulfuric acid half-ester (active compound content 28%) are added, while stirring. The suspension is cooled to 0 to 5° C. and 104.9 parts of a 40.0% strength aqueous monomethylamine solution are added dropwise at this temperature in the course of 10 minutes. The mixture is stirred at 0 to 5° C. for a further 15 minutes. A solution of 28.3 parts of anhydrous calcium chloride in 94.3 parts of water is added dropwise to the resulting solution at 0 to 5° C. in the course of 15 minutes and the mixture is stirred at 0 to 5° C. for 1 hour. Thereafter, 7.1 parts of a 35.3% pure filter-cake of the pigment-dispersing agent of the formula (IX), prepared according to Example 7, are added. The mixture is stirred at 0 to 5° C. for a further 15 minutes. The suspension is heated to 80° C. and stirred at 80° C. for 1 hour, until the cyclization reaction has ended. Thereafter, 2.5 parts of barium sulfate are added and the mixture is stirred at 80° C. for 1 hour. After cooling to 50° C., 98% strength formic acid is added dropwise at this temperature, until a pH of 7 is reached. The mixture is stirred at 50° C. for ½ hour and the pigment formulation obtained is filtered off with suction, washed with water until free from chlorine ions and dried at 80° C. in a circulating air cabinet. 59.1 parts of a pigment formulation based on C.I. Pigment Red 179 are obtained.

Opaque and strong-colored coating films are obtained in the AM coating. The rheology is evaluated as 5 and the viscosity is 4.8 s.

EXAMPLE 7d 524 parts of water are initially introduced into a stirred vessel and 70.1 parts of filter-cake of perylene-3,4,9,10-tetracarboxylic acid dianhydride, 32.5% pure, are introduced, while stirring. 2.5 parts of a commercially available 50% strength aqueous resin soap are added to this suspension and, after cooling to 0 to 5° C., 48.0 parts of a 40.0% strength aqueous monomethylamine solution are added dropwise in the course of 10 minutes. The mixture is stirred at 0 to 5° C. for a further 15 minutes. A solution of 12.9 parts of anhydrous calcium chloride in 43.1 parts of water is added dropwise to the resulting solution at 0 to 5° C. in the course of 15 minutes and the mixture is stirred at 0 to 5° C. for 1 hour. The suspension is heated to 80° C. and stirred at 80° C. for 2 hours, until the cyclization reaction has ended. After cooling to 50° C., 98% strength formic acid is added dropwise at this temperature, until a pH of 7 is reached. Thereafter, 3.5 parts of a 35.3% pure filter-cake of the pigment-dispersing agent of the formula (IX), prepared according to Example 7, 11.4 parts of a 10.9% pure filter-cake of C.I. Pigment Violet 29, prepared by reprecipitation from concentrated sulfuric acid, and 75 parts of isobutanol, 100% pure, are added in succession. The mixture is heated to the boiling point and stirred at the boiling point for 2 hours. The isobutanol is then distilled off azeotropically up to 100° C. at the transition point. After cooling to 50° C., the pigment formulation obtained is filtered off with suction, washed with water until free from chlorine ions and dried at 80° C. in a circulating air cabinet.

27.6 parts of a pigment formulation based on C.I. Pigment Red 179 and C.I. Pigment Violet 29 are obtained. Transparent and strong-colored coating films with a deep color shade are obtained in the AM coating. The rheology is evaluated as 5 and the viscosity is 4.8 s.

EXAMPLE 7e 1170 parts of water are initially introduced into a stirred vessel and 140.6 parts of a 32% pure press-cake of perylene-3,4,9,10-tetracarboxylic acid dianhydride, 50 parts of perylene-3,4,9,10-tetracarboxylic acid monoanhydridemonoimide (25% pure) and 5.3 parts of a commercially available 50% strength aqueous resin soap are introduced, while stirring. After cooling to 0 to 5° C., 94.4 parts of a 40.0% strength aqueous monomethylamine solution are added dropwise in the course of 10 minutes. The mixture is stirred at 0 to 5° C. for a further 15 minutes. A solution of 25.5 parts of anhydrous calcium chloride in 94 parts of water is added dropwise in the resulting solution at 0 to 5° C. in the course of 15 minutes and the mixture is stirred at 0 to 5° C. for 1 hour. The suspension is heated to 80° C. and stirred at 80° C. for 1 hour, until the cyclization reaction has ended. 98% strength formic acid is added dropwise at this temperature, until a pH of 7 is reached. Thereafter, 2.8 parts of the pigment-dispersing agent of the formula (IX), prepared according to Example 7, are added. 168 parts of isobutanol, 100% pure, are then added dropwise, the mixture is stirred at the boiling point for 2 hours and the isobutanol is then distilled off up to 100° C. at the transition point. The mixture is stirred at 50° C. for ½ hour and the pigment formulation obtained is filtered off with suction, washed with water until free from chlorine ions and dried at 80° C. in a circulating air cabinet.

59.1 parts of a pigment formulation based on Pigment Red 179 are obtained. Transparent coating films with a chestnut brown color shade are obtained in the AM coating.

EXAMPLE 7f 3.42 parts of C.I. Pigment Violet 19, β-phase, and 0.18 part of the pigment-dispersing agent of the formula (IX), prepared according to Example 7, are introduced in succession into 26.4 parts of a 35% strength aromatic-containing alkyd melamine resin paint (AM paint) and dispersed with 85 parts of glass beads of diameter 3 mm in a plastic beaker on a paint shaker for 60 minutes. Thereafter, 60 parts of make-up mixture are added and the mixture is dispersed on the paint shaker for 3 minutes. The full shade coating is then sieved off from the grinding bodies.

Transparent and strong-colored coating films with a very good gloss are obtained.

EXAMPLE 8

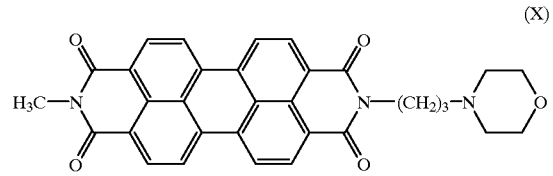

95 parts of N-3-aminopropylmorpholine are initially introduced into a stirred vessel and 5.1 parts of perylene-3, 4,9,10-tetracarboxylic acid monoanhydride-monomethylimide are then introduced. The mixture is then heated to 150° C. and stirred at 150° C. for 1 hour. Thereafter, it is cooled to 100° C. and 100 parts of water are added. After cooling to 60° C., the pigment-dispersing agent is filtered off with suction, washed neutral with water and dried at 80° C.

6.5 parts of pigment-dispersing agent of the formula (X) are obtained.

Analysis:

Calculated: 72.3% C, 4.7% H, 7.9% N, 15.0% O

Found: 71.9% C, 3.8% H, 8.0% N, 14.6% O

The $^1$H- and the $^{13}$C-NMR spectra agree with the structural formula given above.

EXAMPLE 8a 9.5 parts of the quinacridone pigment C.I. Pigment Violet 19 are mixed mechanically with 0.5 part of the pigment-dispersing agent of the formula (X), prepared according to Example 8.

A pigment formulation which gives transparent and strong-colored coating films in the AM coating is obtained. The rheology is evaluated as 5 and the viscosity is 4.9 s.

EXAMPLE 9

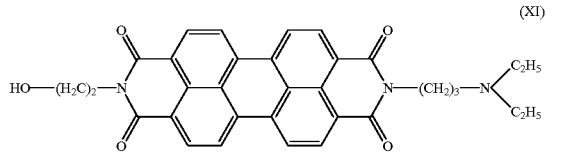

348 parts of water are initially introduced into an autoclave, 17.4 parts of perylene-3,4,9,10-tetracarboxylic acid monoanhydride monohydroxyethylimide are introduced and 10.5 parts of N,N-diethylaminopropylamine are added. The mixture is then heated to 150° C., under pressure, and stirred at 150° C. for 5 hours. After cooling to 25° C., the pigment-dispersing agent is filtered off with suction and washed neutral with water. The filter-cake is introduced into 400 parts of 1% strength potassium hydroxide solution and the mixture is heated to 90° C. and stirred at this temperature for 1 hour. Thereafter, the solid is filtered off with suction at 90° C. and washed with hot 1% strength potassium hydroxide solution until the runnings are colorless. It is then washed neutral with water and dried at 80° C.

18.0 parts of pigment-dispersing agent of the formula (XI) are obtained.

Analysis:

Calculated: 72.4% C, 5.3% H, 7.7% N, 14.6% O

Found: 72.5% C, 5.4% H, 7.8% N, 14.6% O

The $^1$H- and the $^{13}$C-NMR spectra agree with the structural formula given above.

EXAMPLE 9a 19 parts of pigment prepared according to Example 6a and 1 part of the pigment-dispersing agent of the formula (XI), prepared according to Example 9, are mixed mechanically.

A pigment formulation based on C.I. Pigment Red 179 which gives transparent and strong-colored coating films in the PUR coating is obtained. The metallic coating films are brilliant and strong in color. Transparent and strong-colored coating films are obtained in the PE coating. The metallic coating films here are also strong in color.

EXAMPLE 10

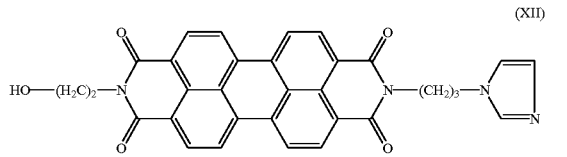

348 parts of water are initially introduced into an autoclave, 17.4 parts of perylene-3,4,9,10-tetracarboxylic acid monoanhydride monohydroxyethylimide are introduced and 10.0 parts of 1-(3-aminopropyl)imidazole are added. The mixture is then heated to 150° C., under pressure, and stirred at 150° C. for 5 hours. After cooling to 25° C., the pigment-dispersing agent is filtered off with suction and washed neutral with water. The filter-cake is introduced into 500 parts of water, the pH is brought to 8–9 by addition of 0.4 part of 10% strength sodium hydroxide solution and the mixture is heated to 90° C. and stirred at this temperature for 1 hour. Thereafter, the pigment-dispersing agent is filtered off with suction at 90° C., washed neutral with water and dried at 80° C.

21.1 parts of pigment-dispersing agent of the formula (XII) are obtained.

Analysis:

Calculated: 70.9% C, 4.1% H, 10.3% N, 14.8% O

Found: 71.7% C, 4.2% H, 10.0% N, 15.4% O

The $^1$H- and the $^{13}$C-NMR spectra agree with the structural formula given above.

EXAMPLE 10a 9.5 parts of C.I. Pigment Violet 19 are mixed mechanically with 0.5 part of the pigment-dispersing agent of the formula (XII), prepared according to Example 10.

A pigment formulation which gives transparent and strong-colored coating films in the AM coating is obtained. The rheology is evaluated as 5 and the viscosity is 5.2 s. Transparent and strong-colored coating films are obtained in the PUR coating. The metallic coating films are brilliant and strong in color.

EXAMPLE 10b 19 parts of C.I. Pigment Red 179, prepared according to Example 6a, 0.5 part of the pigment-dispersing agent of the formula (XII), prepared according to Example 10, and 0.5 part of the pigment-dispersing agent of the formula (IX), prepared according to Example 6, are mixed mechanically.

A pigment formulation which gives transparent and strong-colored coating films in the AM coating is obtained. The rheology is evaluated as 5 and the viscosity is 3.4 s. The fastness to overcoating is very good. Transparent and strong-colored coating films are obtained in the PUR coating.

We claim:

1. A pigment formulation comprising
   a) 99.5 to 80% by weight of at least one organic pigment selected from the group consisting of perylene pigments, perinone pigments, quinacridone pigments, azo pigments, benzimidazolone pigments, anthraquinone pigments and anthanthrone pigments, and
   b) 0.5 to 20% by weight of at least one pigment-dispersing agent having a formula

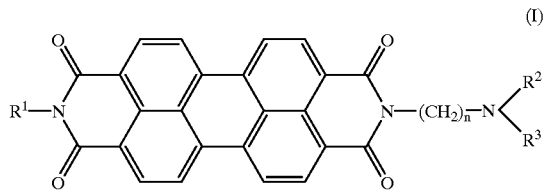

in which $R^1$ is a hydrogen atom, hydroxyl, amino or an alkyl group having 1 to 8 carbon atoms, which is optionally substituted by 1 to 4 chlorine or bromine atoms, by a phenyl, cyano, hydroxyl, carbamoyl, $C_2$–$C_4$-acyl or $C_1$–$C_4$-alkoxy group, or which is perfluorinated or partly fluorinated;

$R^2$ and $R^3$ independently of one another are a hydrogen atom, a substituted or unsubstituted or partly fluorinated or perfluorinated alkyl group having 1 to 20 carbon atoms, or a substituted or unsubstituted or partly fluorinated or perfluorinated alkenyl group having 2 to 20 carbon atoms, it being possible for the substituents to be hydroxyl, phenyl, cyano, chlorine, bromine, $C_2$–$C_4$-acyl or $C_1$–$C_4$-alkoxy, or $R^2$ and $R^3$, together with the N atom, form a saturated, unsaturated or aromatic heterocyclic ring, which optionally contains a further nitrogen, oxygen or sulfur atom in the ring; and n is a number from 1 to 6.

2. The pigment formulation as claimed in claim 1, wherein $R^1$ is a hydrogen atom, benzyl, a $C_1$–$C_6$-alkyl group, or a $C_2$–$C_6$-alkyl group which is substituted by 1 or 2 substituents selected from the group consisting of hydroxyl, acetyl, methoxy, ethoxy, chlorine and bromine;

$R^2$ and $R^3$ independently of one another are a hydrogen atom, a $C_1$–$C_6$-alkyl group, or a $C_1$–$C_6$-alkyl group which is substituted by 1 or 2 substituents selected from the group consisting of hydroxyl, acetyl, methoxy, ethoxy, chlorine and bromine, or $R^2$ and $R^3$, together with the adjacent N atom, form an imidazolyl, piperidinyl, morpholinyl, pipecolinyl, pyrrolyl, pyrrolidinyl, pyrazolyl or piperazinyl ring and n is the number 2 or 3.

3. The pigment formulation as claimed in claim 1, wherein $R^1$ is a methyl or ethyl group, $R^2$ and $R^3$ are each a methyl or ethyl group and n is the number 3.

4. The pigment formulation as claimed in claim 1, wherein $R^1$ is a hydrogen atom or a hydroxyethylene group, $R^2$ and $R^3$ are each a methyl or ethyl group, or $R^2$ and $R^3$, together with the adjacent nitrogen atom, form an imidazolyl or morpholinyl radical and n is the number 3.

5. The pigment formulation as claimed in claim 1, comprising a) 99.5 to 80% by weight of at least one organic pigment selected from the group consisting of perylene pigments, perinone pigments, quinacridone pigments, benzimidazolone pigments, azo pigments, anthraquinone pigments and anthanthrone pigments, b) 0.5 to 20% by weight of at least one perylene compound of the formula (I), c) 0 to 10% by weight of at least one surface-active agent, and d) 0 to 10% by weight of at least one customary additive;

wherein the formulation is 100% by weight.

6. The pigment formulation as claimed in claim 1, comprising a) 99.5 to 80% by weight of at least one organic pigment selected from the group consisting of perylene pigments, perinone pigments, quinacridone pigments, benzimidazolone pigments, azo pigments, anthraquinone pigments and anthanthrone pigments, b) 1 to 10% by weight of at least one perylene compound of the formula (I), c) 0 to 10% by weight of at least one surface-active agent, and d) 0 to 10% by weight of at least one customary additive;

wherein the formulation is 100% by weight.

7. A process for the preparation of a pigment formulation wherein the pigment formulation comprises a) 99.5 to 80% by weight of at least one organic pigment selected from the group consisting of perylene pigments, perinone pigments, quinacridone pigments, azo pigments, benzimidazolone pigments, anthraquinone pigments and anthanthrone pigments, and b) 0.5 to 20% by weight of at least one pigment-dispersing agent having a formula

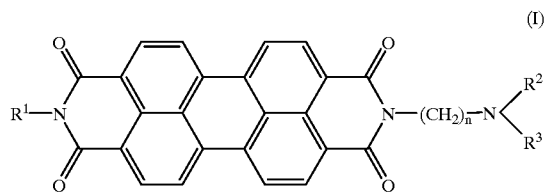

in which $R^1$ is a hydrogen atom, hydroxyl, amino or an alkyl group having 1 to 8 carbon atoms, which is optionally substituted by 1 to 4 chlorine or bromine atoms, by a phenyl, cyano, hydroxyl, carbamoyl, $C_2$–$C_4$-acyl or $C_1$–$C_4$-alkoxy group, or which is perfluorinated or partly fluorinated;

$R^2$ and $R^3$ independently of one another are a hydrogen atom, a substituted or unsubstituted or partly fluorinated or perfluorinated alkyl group having 1 to 20 carbon atoms, or a substituted or unsubstituted or partly fluorinated or perfluorinated alkenyl group having 2 to 20 carbon atoms, it being possible for the substituents to be hydroxyl, phenyl, cyano, chlorine, bromine, $C_2$–$C_4$-acyl or $C_1$–$C_4$-alkoxy, or $R^2$ and $R^3$, together with the N atom, form a saturated, unsaturated or aromatic heterocyclic ring, which optionally contains a further nitrogen, oxygen or sulfur atom in the ring; and n is a number from 1 to 6;

comprising the step of combining the pigment-dispersing agent of the formula (I) and the organic pigment.

8. The process as claimed in claim 7, wherein the pigment-dispersing agent of the formula (I) is added before or during synthesis of the organic pigment, before or during a fine division process on the pigment, or before, during or after a solvent treatment on the pigment.

9. The process as claimed in claim 7, wherein the pigment-dispersing agent, the organic pigment or both are combined in a form of a water-moist press-cake.

10. The process as claimed in claim 7, wherein the pigment-dispersing agent and the organic pigment are combined in a form of a dry powder.

11. The process as claimed in claim 7, wherein the pigment-dispersing agent and an organic perylene pigment are prepared as a mixture by reaction of perylene-3,4,9,10-tetracarboxylic acid monoanhydride monoimides of the formulae (II) or (III), respectively

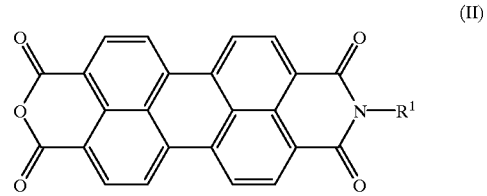

-continued

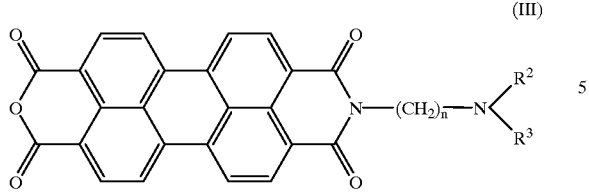
(III)

in which

R$^1$ is a hydrogen atom, hydroxyl, amino or an alkyl group having 1 to 8 carbon atoms, which is optionally substituted by 1 to 4 chlorine or bromine atoms, by a phenyl, cyano, hydroxyl, carbamoyl, C$_2$–C$_4$-acyl or C$_1$–C$_4$-alkoxy group, or which is perfluorinated or partly fluorinated;

R$^2$ and R$^3$ independently of one another are a hydrogen atom, a substituted or unsubstituted or partly fluorinated or perfluorinated alkyl group having 1 to 20 carbon atoms, or a substituted or unsubstituted or partly fluorinated or perfluorinated alkenyl group having 2 to 20 carbon atoms, it being possible for the substituents to be hydroxyl, phenol, cyano, chlorine, bromine, C$_2$–C$_4$-acyl or C$_1$–C$_4$-alkoxy, or R$^2$ and R$^3$, together with the N atom, form a saturated, unsaturated or aromatic heterocyclic ring, which optionally contains a further nitrogen, oxygen or sulfur atom in the ring; and n is a number from 1 to 6:

with an amine of the formula (IV) or (V) respectively

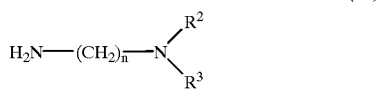
(IV)

in which R$^1$, R$^2$, R$^3$, and n are defined as above.

12. A method of pigmenting high molecular weight organic materials of natural or synthetic origin in a form selected from the group consisting of plastic compositions, melts, spinning solutions, coatings, paints, toners and printing inks, comprising the step of adding a pigment formulation to said materials wherein said pigment formulation comprises
   a) 99.5 to 80% by weight of at least one organic pigment selected from the group consisting of perylene pigments, perinone pigments, quinacridone pigments, azo pigments, benzimidazolone pigments, anthraquinone pigments and anthanthrone pigments, and
   b) 0.5 to 20% by weight of at least one pigment-dispersing agent having a formula

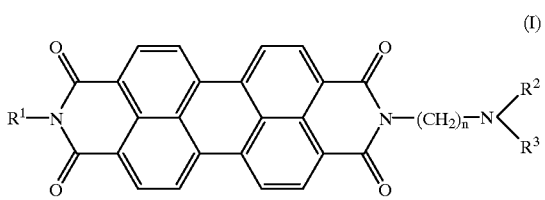
(I)

in which

R$^1$ is a hydrogen atom, hydroxyl, amino or an alkyl group having 1 to 8 carbon atoms, which is optionally substituted by 1 to 4 chlorine or bromine atoms, by a phenyl, cyano, hydroxyl, carbamoyl, C$_2$–C$_4$-acyl or C$_1$–C$_4$-alkoxy group, or which is perfluorinated or partly fluorinated;

R$^2$ and R$^3$ independently of one another are a hydrogen atom, a substituted or unsubstituted or partly fluorinated or perfluorinated alkyl group having 1 to 20 carbon atoms, or a substituted or unsubstituted or partly fluorinated or perfluorinated alkenyl group having 2 to 20 carbon atoms, it being possible for the substituents to be hydroxyl, phenyl, cyano, chlorine, bromine, C$_2$–C$_4$-acyl or C$_1$–C$_4$-alkoxy, or R$^2$ and R$^3$, together with the N atom, form a saturated, unsaturated or aromatic heterocyclic ring, which optionally contains a further nitrogen, oxygen or sulfur atom in the ring; and n is a number from 1 to 6.

13. A pigment preparation comprising
   a) at least one organic pigment selected from the group consisting of perylene pigments, perinone pigments, quinacridone pigments, azo pigments, benzimidazolone pigments, anthraquinone pigments and anthanthrone pigments,
   b) at least one pigment-dispersing agent having a formula

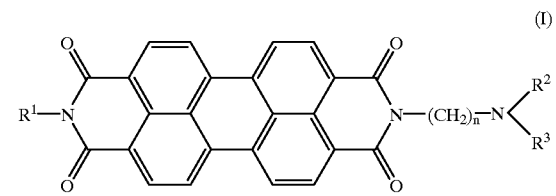
(I)

in which

R$^1$ is a hydrogen atom, hydroxyl, amino or an alkyl group having 1 to 8 carbon atoms, which is optionally substituted by 1 to 4 chlorine or bromine atoms, by a phenyl, cyano, hydroxyl, carbamoyl, C$_2$–C$_4$-acyl or C$_1$–C$_4$-alkoxy group, or which is perfluorinated or partly fluorinated;

R$^2$ and R$^3$ independently of one another are a hydrogen atom, a substituted or unsubstituted or partly fluorinated or perfluorinated alkyl group having 1 to 20 carbon atoms, or a substituted or unsubstituted or partly fluorinated or perfluorinated alkenyl group having 2 to 20 carbon atoms, it being possible for the substituents to be hydroxyl, phenyl, cyano, chlorine, bromine, C$_2$–C$_4$-acyl or C$_1$–C$_4$-alkoxy, or R$^2$ and R$^3$, together with the N atom, form a saturated, unsaturated or aromatic heterocyclic ring, which optionally contains a further nitrogen, oxygen or sulfur atom in the ring; and n is a number from 1 to 6, and c) a high molecular weight organic material of natural or synthetic origin in a form selected from the group consisting of plastic compositions, melts, spinning solutions, coatings, paints, toners and printing inks.

* * * * *

UNITED STATES PATENT AND TRADEMARK OFFICE
CERTIFICATE OF CORRECTION

PATENT NO. : 5,958,129
DATED : September 28, 1999
INVENTOR(S) : URBAN et al.

It is certified that error appears in the above-identified patent and that said Letters Patent is hereby corrected as shown below:

In claim 11, below formula (IV), please insert --$H_2N-R^1$ (V) --.

Signed and Sealed this

Twenty-fifth Day of April, 2000

Attest:

Q. TODD DICKINSON

*Attesting Officer*   *Director of Patents and Trademarks*